United States Patent

Bower (10) Patent No.: US 10,125,043 B2
(45) Date of Patent: Nov. 13, 2018

(54) CRYSTAL INFUSED DRINKING VESSEL

(71) Applicant: Danielle Bower, Santa Monica, CA (US)

(72) Inventor: Danielle Bower, Santa Monica, CA (US)

( * ) Notice: Subject to any disclaimer, the term of this patent is extended or adjusted under 35 U.S.C. 154(b) by 264 days.

(21) Appl. No.: 15/206,243

(22) Filed: Jul. 9, 2016

(65) Prior Publication Data

US 2018/0009702 A1    Jan. 11, 2018

(51) Int. Cl.
| | |
|---|---|
| *C03B 9/31* | (2006.01) |
| *C03B 11/10* | (2006.01) |
| *C03B 23/24* | (2006.01) |
| *C03C 27/06* | (2006.01) |
| *C03C 14/00* | (2006.01) |
| *C03B 11/14* | (2006.01) |

(52) U.S. Cl.
CPC .............. *C03B 9/31* (2013.01); *C03B 11/14* (2013.01); *C03C 14/004* (2013.01)

(58) Field of Classification Search
CPC ........... C03B 9/31; C03B 11/10; C03B 23/24; C03B 2215/406; C03C 27/06
See application file for complete search history.

(56) References Cited

U.S. PATENT DOCUMENTS

| | | | | |
|---|---|---|---|---|
| 1,787,619 | A * | 1/1931 | Emerson | C03B 9/02 65/60.8 |
| 2,183,961 | A * | 12/1939 | Fischer | C03B 9/31 65/46 |
| 2,500,105 | A * | 3/1950 | Weber | C03B 7/08 220/DIG. 11 |
| 2,802,309 | A * | 8/1957 | Brune | C03B 9/1932 215/12.2 |
| 4,260,405 | A * | 4/1981 | Ambrogi | A47J 36/04 65/42 |
| 4,457,771 | A * | 7/1984 | Ambrogi | C03B 5/12 264/148 |
| 2005/0056057 | A1* | 3/2005 | Marcolin | C03B 11/14 65/48 |

\* cited by examiner

*Primary Examiner* — Cynthia Szewczyk
(74) *Attorney, Agent, or Firm* — Fitzsimmons IP Law (57) ABSTRACT

A method of infusing silicon dioxide ($SiO_2$) in a crystalline state into a structure comprising $SiO_2$ in a non-crystalline amorphous state is provided. In one embodiment of the present invention, a first material comprising $SiO_2$ is heated to a melting point, converting the $SiO_2$ from a crystalline state into a non-crystalline amorphous state. A second material comprising $SiO_2$ is then applied to the first material while the first material is at a temperature that is hot enough to render the first material pliable, but not so hot as to convert the $SiO_2$ in the second material from a crystalline state into a non-crystalline state. The first material is then cooled slowly over a period of time to relieve internal stresses introduced during the manufacturing process.

18 Claims, 6 Drawing Sheets

CRYSTAL INFUSED DRINKING VESSEL

BACKGROUND OF THE INVENTION

1. Field of the Invention

The invention relates generally to the field of crystals, or more particularly to a process of manufacturing a first structure comprising silicon dioxide ($SiO_2$) in a non-crystalline amorphous state having a second structure comprising silicon dioxide ($SiO_2$) in a crystalline state infused therein.

2. Description of Related Art

Crystals are traditionally known for their beauty, and are often used in ornamental designs, such as jewelry. However, over the years, many cultures have also touted crystals for their healing abilities. For example, Clear Quartz Crystals, which are considered strong amplifiers of energy, are often used in healing rooms by alchemical healing practitioners. Crystals can also be placed in an individual's house, or worn by an individual, to increase the individual's spirituality and/or wellbeing.

As crystals have become more popular, and their benefits more widely accepted, the way in which they are used has also evolved. One popular way in which crystals are used is to create crystal (or gem) water. Traditionally, crystal water is created by placing crystals in or near drinking water in an effort to transfer energy into the water.

Spring water is naturally energetic, and is preferred by most over city or "tap" water for human consumption. While there are various ways to purify water (e.g., filtering, reverse osmosis, etc.) to remove minerals, deposits, and other impurities that render tap water unhealthy and/or unappealing to the senses (e.g., smell, taste, etc.), purification does not revitalize or reenergize the water. The easiest way to reenergize water is to place the water in contact or close proximity with substances that are naturally energetic, such as crystals. Studies have shown that water that has been reenergized, e.g., through the use of crystals, is structurally similar to natural spring water, and is more beneficial to the human body than tap water (e.g., can carry additional oxygen, is more hydrating, etc.).

The most common way to create crystal water, or to use crystals to reenergize water, is to place a plurality of crystals in a glass of drinking water for a period of time. However, there are many drawbacks associated with this method of creating crystal water. Not only is this method tedious in that it requires constant cleaning (e.g., cleaning the glass, cleaning each crystal, etc.), but there are dangers associated with this method—perhaps the biggest of which being leaching. When certain crystal are placed in water, minerals from those crystals can leach into the water, and create water that is unsafe for human consumption.

One way of addressing the leaching issue is through the use of a container that has separate, discrete compartments, e.g., one for holding the water and one for holding the crystals. While this may keep the crystals from coming into contact with the water, and thereby prevent leaching, the complexity of such a device can be off-putting, heavy, and generally includes a plurality of components that must be maintained (e.g., constantly cleaned, etc.).

There is therefore a need for an apparatus that would allow a user to revitalize or reenergize water (or other liquid) that overcomes at least some of the drawbacks discussed above. The apparatus should be safe, simple, effective, and require minimal maintenance. There is also a need for a simple and cost effective method of manufacturing such an apparatus.

SUMMARY OF THE INVENTION

The present invention provides a method of infusing silicon dioxide ($SiO_2$) in a crystalline form (or state) into $SiO_2$ in a non-crystalline amorphous form (or state). Preferred embodiments of the present invention involve heating a first material comprising $SiO_2$ to a temperature that converts the $SiO_2$ from its crystalline state into a non-crystalline amorphous state, applying a second material comprising $SiO_2$ to the first material while the first material is maintained at a temperature that is hot enough to render the first material workable (or pliable), but not so hot to convert the $SiO_2$ in the second material from its crystalline state into a non-crystalline amorphous state, and cooling the first and second materials slowly, over a period of time, to relieve internal stresses introduced during the manufacturing process.

In one embodiment of the present invention, the first material is a glass material that comprises $SiO_2$ (e.g., Soda-Lime-Silica, etc.) and is heated to its melting point, which it generally between 1400° and 1600° C. At this temperature, the glass will appear "white hot," and will be in a non-crystalline amorphous state. A first portion of the glass can then be "gathered" by a device, such as a blow pipe, and rolled on a flat surface, such as a "marver." While the glass is being rolled (or otherwise manipulated), it may be routinely heated to keep the glass at a workable (or pliable) temperature, which is generally between 730° and 1040° C. At this temperature, the glass will appear bright orange, and will remain in a non-crystalline amorphous state.

While the glass is in a workable state, an outer surface of the glass is then rolled over a plurality of crystals, resulting in the crystals being pressed either completely or partially into the outer surface of the glass. In one embodiment of the present invention, a "paddle" (or the like) is used to press all (or most) of the crystals into the outer surface of the glass. In another embodiment of the present invention, the glass is then heated (e.g., via a glory hole, a torch, etc.), allowing the glass to "accept" the crystal particles.

A second portion of glass material may then be "gathered," and applied to the outer surface of the first portion of glass (i.e., the glass that now includes the plurality of crystals). If the crystals were previously pressed completely into the first portion of glass, then the second portion of glass merely serves to increase the distance between the crystals and an outer (or inner) surface of the resulting glass structure. Alternatively, if the crystals were only pressed partially into the first portion of glass, then the second portion of glass serves to encapsulate the crystals within the glass structure.

Once the crystals are infused within the glass, the glass can then be formed into a desired shape (e.g., a vessel for holding liquid, etc.). This may be accomplished using any number of tools generally known to those skilled in the art, including a paddle, punty, bench, marvel, block, jack(s), tweezers, paper, shears, and/or mold(s). While the tools used to form the glass may vary, it is imperative to keep the glass hot enough so that the glass can be formed, but not so hot as to convert the crystals, or the $SiO_2$ included therein, into a non-crystalline amorphous state. While glass is pliable and can be formed at its melting temperature (e.g., between 1400° and 1600° C.), such a temperature would destroy the crystalline properties of the crystals, and defeat the primary purpose of the present invention.

Once the glass is formed, the entire apparatus must be "annealed," which is a slow cooling process that relieves residual internal stresses introduced during the manufacturing process. If glass is cooled too quickly, it becomes strained, which can result in breakage. Alternatively, if glass is cooled slowly through its critical temperature (which varies depending on the type of glass that is being used), strain is reduced, and the glass is considered "annealed." Given the composition of the apparatus being annealed (e.g., in this case comprising both crystalline and non-crystalline $SiO_2$), the apparatus should be cooled to a temperature between 20° and 100° C. over a three to ten hour period.

In another embodiment of the present invention, after the glass material is heated to its melting point (e.g., between 1400° and 1600° C.), a first portion of glass is applied to a mold. This may be done using techniques generally known to those skilled in the art, such as "pressing" or "blowing," and results in a layer of glass that has a first (inner) surface adjacent the mold and a second (outer) surface that faces away from the mold (i.e., opposite the first surface). After cooling the glass to a workable temperature, a plurality of crystals are then applied to (e.g., blown into, etc.) the outer surface of the glass. This may result in at least one crystal being pushed completely into the outer surface of the glass and/or at least one crystal being pushed only partially into the outer surface of the glass. The glass may then be heated, allowing the glass to "accept" the crystal particles. A second portion of glass may then be applied to the first portion of glass (i.e., the glass that now includes the plurality of crystals). Again, this can be performed using known techniques, such as "pressing" or "blowing." If the crystals were pressed completely into the glass, then the second portion of glass merely serves to increase the distance between the crystals and the outer (or inner) surface of the resulting glass structure. Alternatively, if the crystals are only pressed partially into the glass, then the second portion of glass serves to encapsulate the crystal within the glass structure.

In one embodiment of the present invention, the first mold is used to form the glass into a desired shape (e.g., a vessel for holding liquid, etc.). In alternate embodiments, more than one mold is used to form the glass into the desired shape. When using a second mold, the glass will generally be cooled, allowing it to be moved between the molds, and then re-heated, allowing the glass to be further formed. As previously stated, in forming the desired shape, it is imperative to heat the glass to a temperature that allows the glass to remain pliable, but not to a temperature that destroys the crystalline properties of the crystals. Thus, care must be taken to heat the glass into a range that achieves both objectives. Once the glass is formed, the entire apparatus should then be "annealed" to remove residual internal stresses.

A method for manufacturing a glass structure involves heating a glass material containing silicon dioxide ($SiO_2$), such as Soda-Lime-Silica, etc., to its melting point, which is generally between 1400° and 1600° C. A first portion of glass is then applied to a device, such as a blow pipe or a mold. The glass is then cooled below its melting point, but within a range considered to be workable (generally between 730°-1,040° C.), and a plurality of crystals containing $SiO_2$, such as Clear Quartz, Citrine, etc., are applied to the first portion of glass. A second portion of glass is then applied to the first portion (i.e., the glass that now includes the plurality of crystals). The overall apparatus, which now includes the first and second portions of glass and the plurality of crystals, is maintained at a workable temperature and formed into a desired shape, such as a vessel for holding liquid. The resulting structure is then annealed as previously discussed.

A more complete understanding of a method for infusing silicon dioxide ($SiO_2$) in a crystalline state into $SiO_2$ in a non-crystalline amorphous state, will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention is directed toward a process of infusing silicon dioxide ($SiO_2$) in a crystalline form (or state) into $SiO_2$ in a non-crystalline amorphous form (or state). While the preferred embodiment describes a process of infusing at least one crystal comprising $SiO_2$ into a glass vessel for holding water, the present invention is not so limited. For example, those skilled in the art will appreciate that the disclosed process can be used to infuse any solid, including crystals, gemstones, etc., into any glass structure. The disclosed embodiment is preferred, however, in that it can be used to create crystal (or gem) water. It should also be appreciated that while there are many types of crystals comprising $SiO_2$ (e.g., Purple Amethyst, Smokey Quartz, Golden Yellow Citrine, Rose Quartz, Clear Quartz, etc.), and many types of glasses comprising $SiO_2$ (e.g., Soda-Lime-Silica, Lead-Oxide, Fused Quartz, Pyrex, etc.), unless stated otherwise, those terms are used herein in their broadest sense, to include any and all types of crystals and glasses generally known to those skilled in the art.

Glass is defined as a non-crystalline amorphous solid that is generally transparent, can be easily cleaned and/or sterilized, and is commonly used to transport and hold fluids, such as water. There are generally three steps involved in making glass—heating, forming, and cooling (or annealing). The first step involves heating the glass until the glass is melted, which is typically between 1400° and 1600° C. (this temperature varies depending on the type of glass that is being used). At this temperature, the glass appears "white hot," and material (e.g., $SiO_2$) that is in a crystalline state is converted into a non-crystalline amorphous state. The molten glass is then formed into a desired shape. Once the desired shape is obtained, the glass is then cooled (or annealed) to relieve internal residual stresses introduced during the manufacturing process. If the glass is not annealed properly (e.g., cooled too quickly), it may become strained, and more susceptible to breakage.

Crystals, or crystalline solids, are solid materials whose constituents (e.g., atoms, molecules, etc.) are arranged in a highly ordered microscopic structure, forming a crystal lattice that extends in all directions. Like glass, crystal generally melts around 1600° C. It is at this temperature that the crystal loses its crystalline properties. For example, if quartz crystal is heated to its melting point and then quickly cooled, it is converted from a crystalline solid into the non-crystalline amorphous solid, commonly referred to as "fused quartz."

Figure 1:
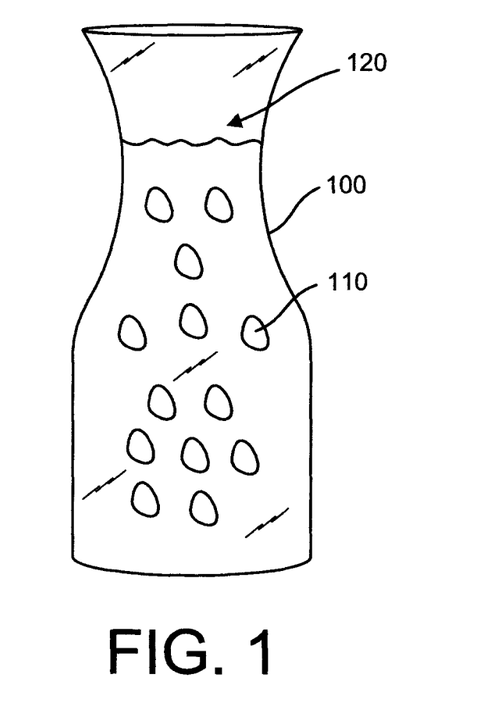
FIG. 1 depicts a glass vessel for holding liquid comprising silicon dioxide ($SiO_2$) in a crystalline state (e.g., a plurality of crystals) infused within silicon dioxide ($SiO_2$) in a non-crystalline amorphous state (e.g., soda-lime glass, etc.)

FIG. 1 shows a vessel for holding liquid 120 in accordance with one embodiment of the present invention, where a plurality of crystals 110 (i.e., crystalline solids) are infused within a glass structure 100 (i.e., a non-crystalline amorphous solid). It should be appreciated that the glass structure 100 is not limited to any particular type of glass, and can include any type of glass generally known to those skilled in the art, including, for example, Fused Quartz ($SiO_2$), Soda-Lime-Silica ($SiO_2$, $Na_2O$, $CaO$, $MgO$, and $Al_2O_3$), Pyrex ($SiO_2$, $B_2O_3$, $Na_2O$, and $Al_2O_3$), Lead-Oxide ($SiO_2$, $PbO$, $K_2O$, $Na_2O$, $ZnO$, and $Al_2O_3$), and Aluminosilicate ($SiO_2$, $Al_2O_3$, $CaO$, $MgO$, $BaO$, and $B_2O_3$). It should also be appreciated that the plurality of crystals 110 are not limited to any particular type of crystal, and can include any type of crystal generally known to those skilled in the art, including, but not limited to, Clear Quartz, Purple Amethyst, Smokey Quartz, Golden Yellow Citrine, Rose Quartz, Herkimer Diamonds, Spirit Quartz, Lithium Quartz, Golden Rutilated Quartz, and Green Amethyst. It should further be appreciated that the glass structure may include more than one type of material infused therein. For example, a glass structure that includes a first crystal, e.g., an energy amplifier, such as Clear Quartz, a second crystal, e.g., an energy recharger, such as Golden Yellow Citrine, and/or a gemstone, such as a ruby or a diamond, is within the spirit and scope of the present invention.

Figure 2:
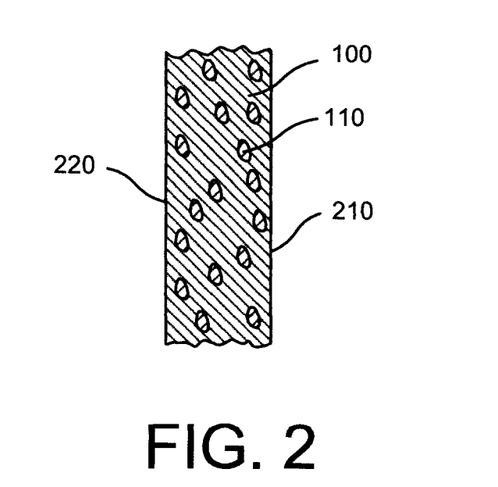
FIG. 2 shows a cross-section of the glass vessel shown in FIG. 1.

As shown in FIG. 2, the glass structure 100 has an inner surface 220 and an outer surface 210. In a preferred embodiment of the present invention, each crystal 110 is fully encased by the glass structure 100, i.e., located between the inner surface 220 and the outer surface 210 of the glass structure 100. It should be appreciated, however, that in alternate embodiments of the present invention, at least one crystal is only partially encased within the glass structure, e.g., having a surface that is exposed, or contributes to the inner surface and/or outer surface of the glass structure. Such embodiments can be used, for example, to provide texture to a surface of the glass structure and/or allow liquid to come into direct contact with exposed crystals. Processes used for making the apparatus shown in FIG. 1 will now be discussed.

Figure 3A:
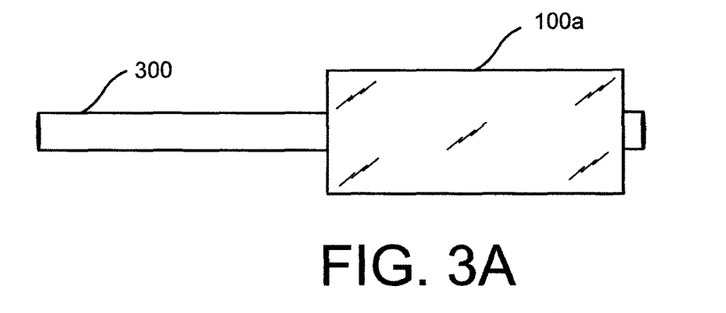
FIGS. 3A-3E illustrate different stages for making the glass vessel shown in FIG. 1 in accordance with one embodiment of the present invention.
Figure 3B:
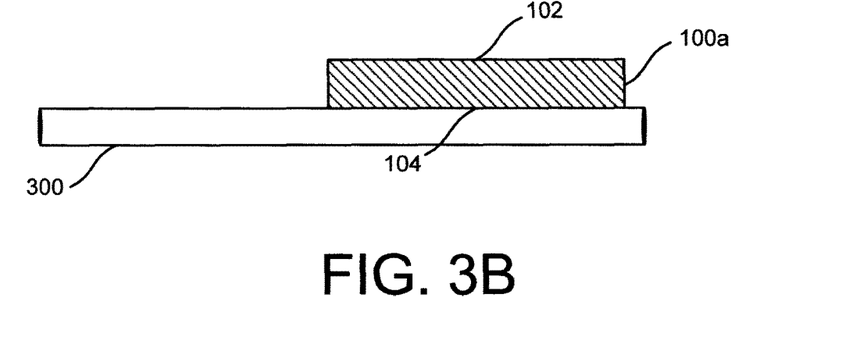

In one embodiment of the present invention, a glass material is heated to its melting point, which it generally between 1400° and 1600° C. (melting temperature will vary depending on the type of glass being used). This is typically accomplished using a furnace. At this temperature, the glass will appear "white hot," and will be in a non-crystalline amorphous state. As shown in FIG. 3A, a blow pipe 300 can be used to "gather" a first portion of the molten glass 100a. The glass may then be rolled on a flat surface, such as a "marver," which is a flat slab of marble or steel, to form a desired shape (e.g., tubular). After the glass has been rolled, it will have a first (inner) surface 104 adjacent the blow pipe, and a second (outer) surface 102 facing away from the blow pipe (i.e., opposite the first surface). This can be seen in FIG. 3B.

After glass has been removed from the furnace, the glass should be routinely heated in order to keep it workable, or pliable. This can be accomplished using a "glory hole," which is a second type of furnace known to those skilled in the art. However, for smaller projects, a torch may also be used. Glass is generally considered workable when it is between 730° and 1040° C. (again, workable temperatures will vary depending on the type of glass being used). At this temperature, the glass will generally be bright orange in color.

Figure 3C:
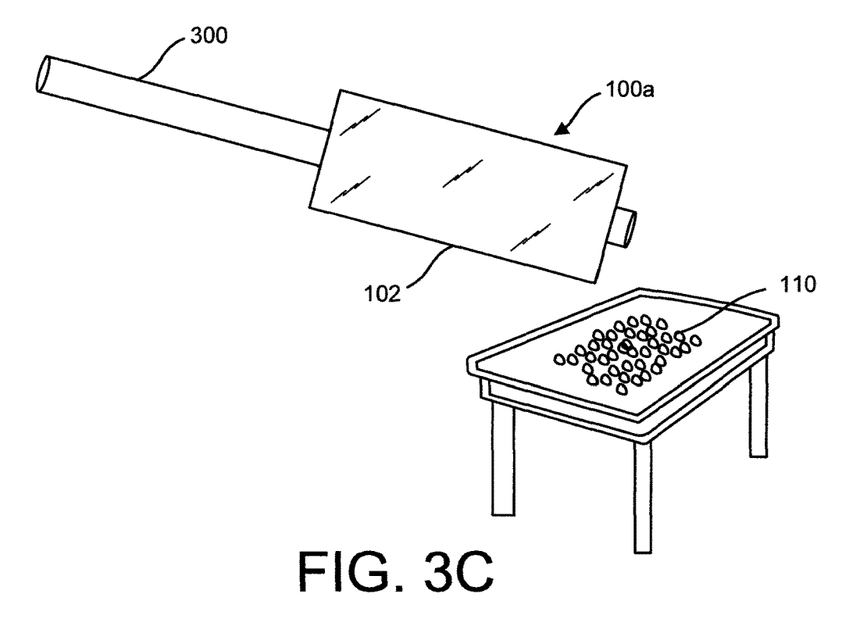
Figure 3D:
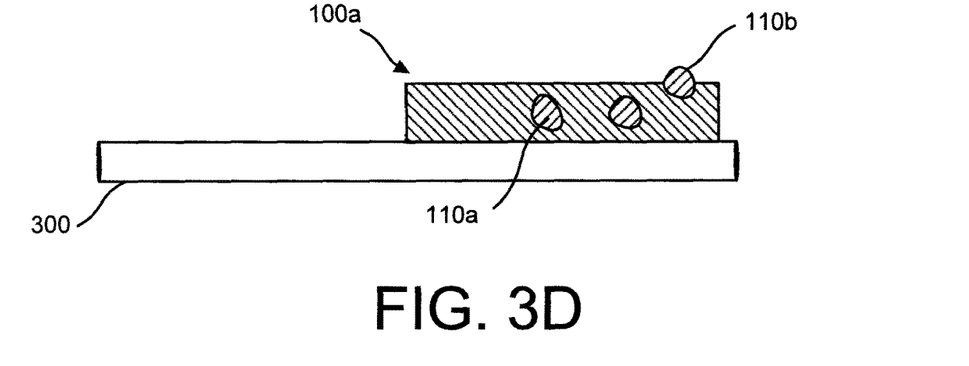

As shown in FIG. 3C, while the glass is in a workable state (e.g., between 730° and 1040° C.), an outer surface 102 of the glass 100a is then rolled over a plurality of crystals 110. As shown in FIG. 3D, this may result in at least one crystal 110a being pressed completely into the first portion of glass 100a, and/or at least one crystal 110b being pressed only partially into the first portion of glass 100a. In one embodiment of the present invention, a "paddle" (or the like) may be used to press crystals into the first portion of glass 100a. In another embodiment of the present invention, the first portion of glass 100a may then be heated (e.g., via the glory hole, the torch, etc.), allowing the glass to "accept" the crystal particles. It should be appreciated that while the crystal particles may be any size, they should preferably have a cross-section between 0.8 and 4.0 mm, thereby allowing them to be more easily incorporated into, and accepted by, the first portion of glass.

Figure 3E:
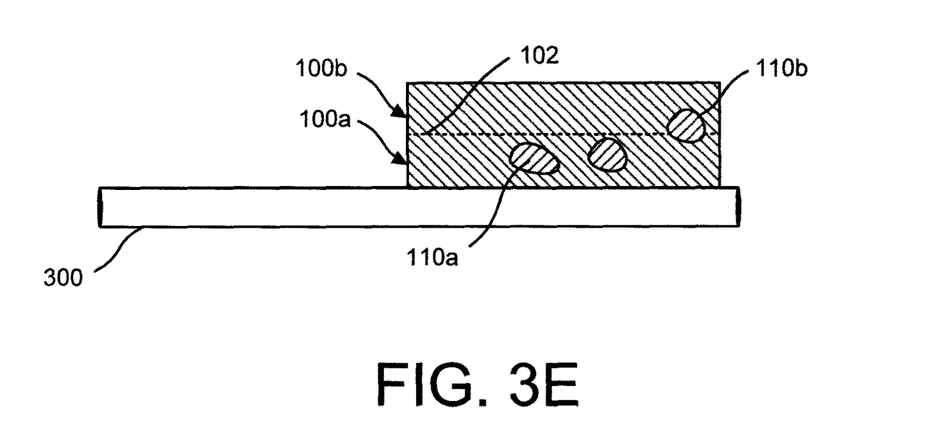

As shown in FIG. 3E, a second "gather" is then performed, applying a second portion 100b of the glass material to the blow pipe 300. In this embodiment, the second portion of glass 100b is applied (e.g., gathered, rolled, worked, etc.) to the outer surface 102 of the first portion of glass 100a. If the crystals are pressed completely into the first portion of glass 100a (e.g., 110a), then the second portion of glass 100b merely serves to increase the distance between the crystal (e.g., 110a) and the outer (or inner) surface of the resulting glass structure 100. Alternatively, if the crystals are only pressed partially into the first portion of the glass 100a (e.g., 110b), then the second portion of glass 100b serves to encapsulate the crystal (e.g., 110b) within the glass structure 100.

It should be appreciated that the second portion of glass can be applied to the first portion of glass in either a molten state (e.g., above 1400° C.) or a workable state (e.g., above 700°). If the crystals (or certain ones) are partially exposed, e.g., only partially pressed into the first portion of glass, then the second portion of glass should be in a workable state, but not a molten state. This ensures that the crystalline properties of the crystals are not destroyed. If, however, the crystals are not exposed, e.g., completely pressed into the first portion of glass, then the second portion of glass can be applied in either a workable state or a molten state, as the crystals are protected by the first portion of glass, which (at this stage) is always kept below its melting temperature.

Figure 5:
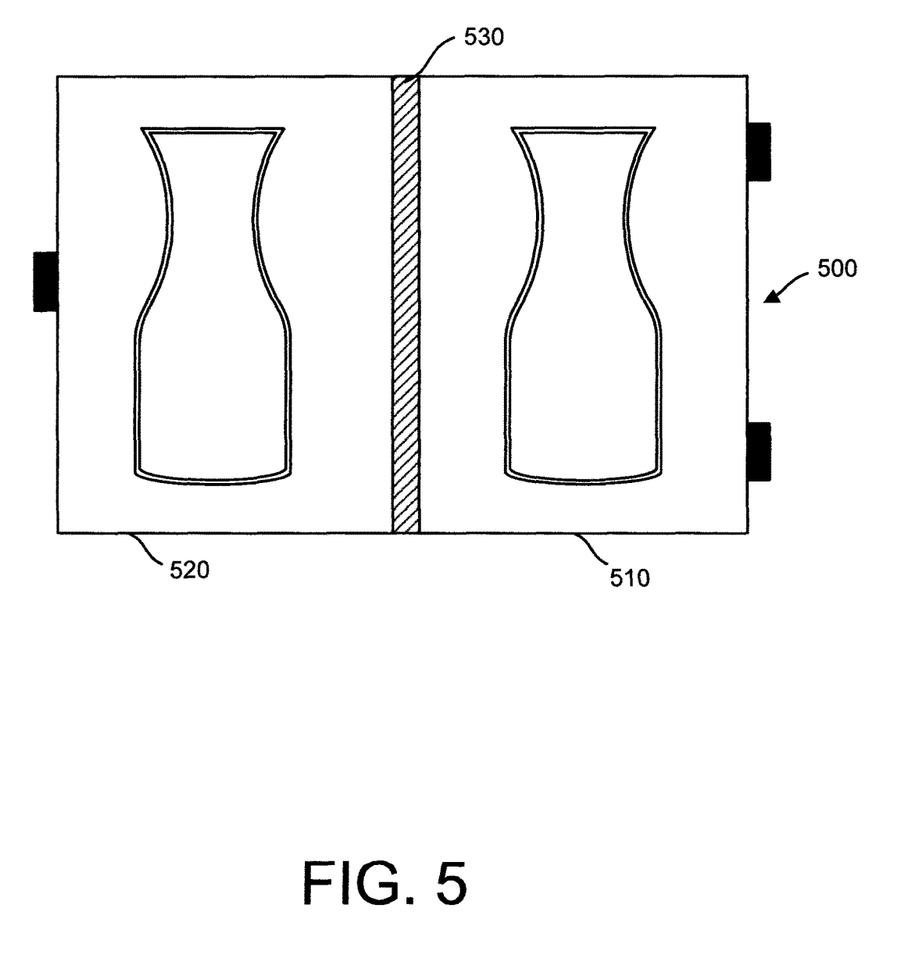
FIG. 5 illustrates one method of forming a glass structure into a desired shape, such as a vessel for holding liquid (see, e.g., FIG. 1)

Once the crystals are infused within the glass, the glass can then be formed into a desired shape (e.g., a vessel for holding liquid, etc.). This may be accomplished using any number of tools, including a paddle, punty, bench, marver, block, jack(s), tweezers, paper, shears, and/or mold(s) (see, e.g., FIG. 5). While the tools used to form the glass may vary, it is imperative to keep the glass at a workable temperature (e.g., which is generally between 730° and 1,040° C.), so the glass can be formed, and to not exceed a melting temperature (e.g., which is generally above 1400° C.). While glass may be formed at its melting temperature (e.g., using a mold), such a temperature would destroy the crystalline properties of the crystals, or the $SiO_2$ included therein. As discussed above, it is necessary to keep the crystals in a crystalline state in order for the crystals to function properly (e.g., to impart energy into water (i.e., create "crystal water"), etc.). Thus, application of the crystals to the glass must take place at a temperature above 730° C., but below 1600° C., and preferably below 1400° C.

Once the glass is formed, the entire apparatus must be "annealed," which is a slow cooling process that relieves residual internal stresses introduced during the manufacturing process. If the glass is cooled too quickly, it becomes strained, which can result in breakage. The amount of strain depends on how quickly the glass passes through a critical temperature range, which is generally around 450° C. (again, this temperature varies depending on the type of glass being used). If the glass is cooled slowly through the critical temperature range, strain is reduced, and the glass is considered "annealed." Annealing is usually performed in a third furnace called a "lehr" or "annealer." Given the composition of the apparatus being annealed (e.g., comprising both crystalline and non-crystalline $SiO_2$), the apparatus should be cooled to room temperature over a three to ten hour period. In one embodiment of the present invention, the apparatus is left in an annealer set between 450° and 510° C. between a half hour and two hours. The temperature of the annealer is then reduced by 65° to 95° C. every hour for a total of five to eight hours. This slow cooling ensures that the apparatus is uniformly reduced to a lower temperature (e.g., room temperature) and the stress point of the glass is not triggered.

Figure 4A:
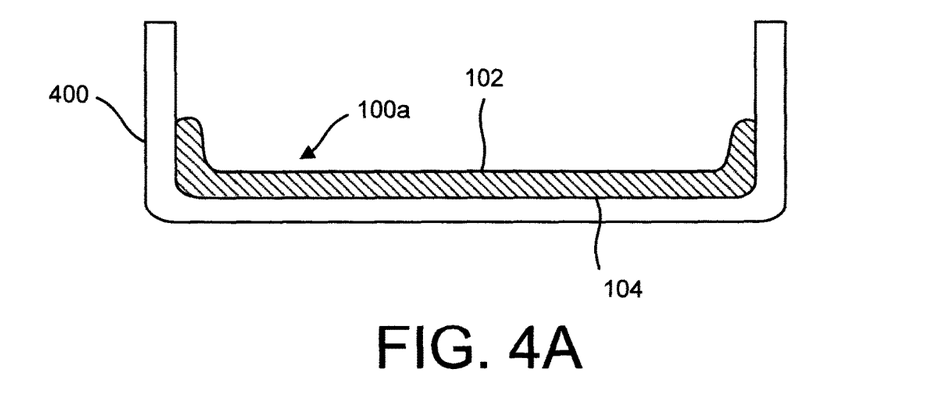
FIGS. 4A-4C illustrate different stages for making the glass vessel shown in FIG. 1 in accordance with another embodiment of the present invention.

In another embodiment of the present invention, as shown in FIG. 4A, after the glass is heated to its melting point, a first portion of glass 100a is applied to a mold 400, where the first portion 100a includes a first (inner) surface 104 adjacent the mold 400, and a second (outer) surface 102 opposite the first surface 104. It should be appreciated that the mold shown in FIG. 4A is exemplary, and should not be considered a limitation of the present invention. The mold may be a simple mold, similar to the one shown in FIG. 4A, a complex mold, like the one shown in FIG. 5, or more than one mold, such as both the mold shown in FIG. 4 (first mold) and the mold shown in FIG. 5 (second mold), the left half of the mold shown in FIG. 5 (first mold) and the right half of the mold shown in FIG. 5 (second mold), etc. It should also be appreciated that the first portion of glass 100a can be applied to the mold 400 using any technique generally known to those skilled in the art, including, but not limited to, "pressing" the first portion of glass 100a against the mold 400, or "blowing" the first portion of glass 100a into the mold 400. The first portion of glass 100a is then cooled, but kept in a working state. As previously discussed, glass is generally considered workable when it is between 730° and 1040° C. (again, keeping in mind that workable temperatures will vary depending on the type of glass being used).

Figure 4B:
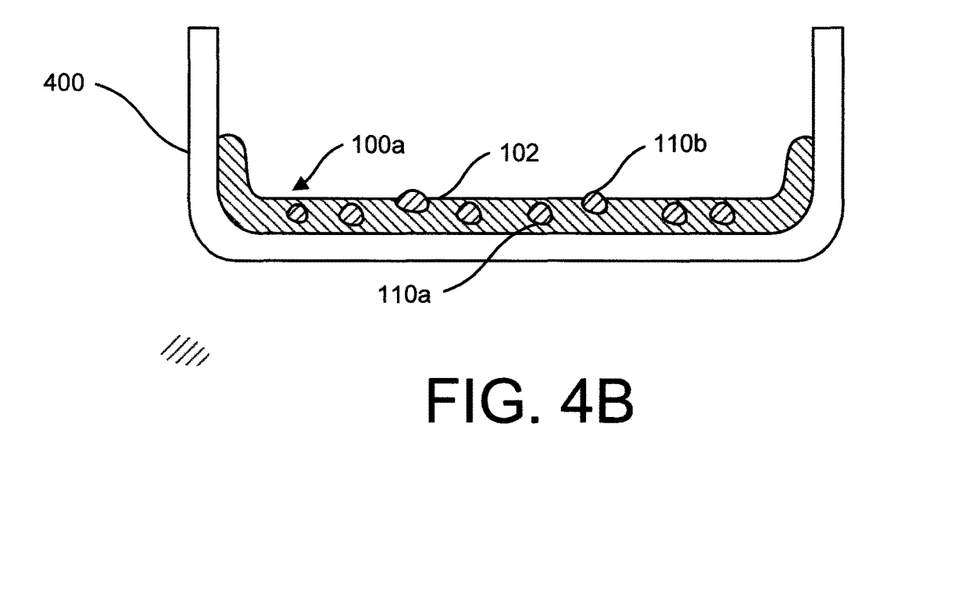

As shown in FIG. 4B, a plurality of crystals 110a, 110b are applied to the outer surface 102 of the first portion of glass 100a. This may be done by "pressing" or "blowing" the crystals into the mold 400 This may result in at least one crystal 110a being pressed (or blown) completely into the glass 100a, and/or at least one crystal 110b being pressed (or blown) only partially into the glass 100a. In another embodiment of the present invention, the glass 100a may then be heated, allowing the glass to "accept" the crystal particles. It should be appreciated that while heat may allow the first portion of glass 100a to "flow" around the plurality of crystals 110a, 110b, and increase bond strength between the glass 100a and the plurality of crystals 110a, 110b, the temperature should not be increased to a level that converts the crystals, or the $SiO_2$ included therein, into a non-crystalline amorphous state. Thus, the glass must be kept workable (e.g., above 700° C.), but below molten (e.g., around 1600° C.), keeping in mind that the hotter the glass, the more easily crystals can be incorporated into, and accepted by the glass.

Figure 4C:
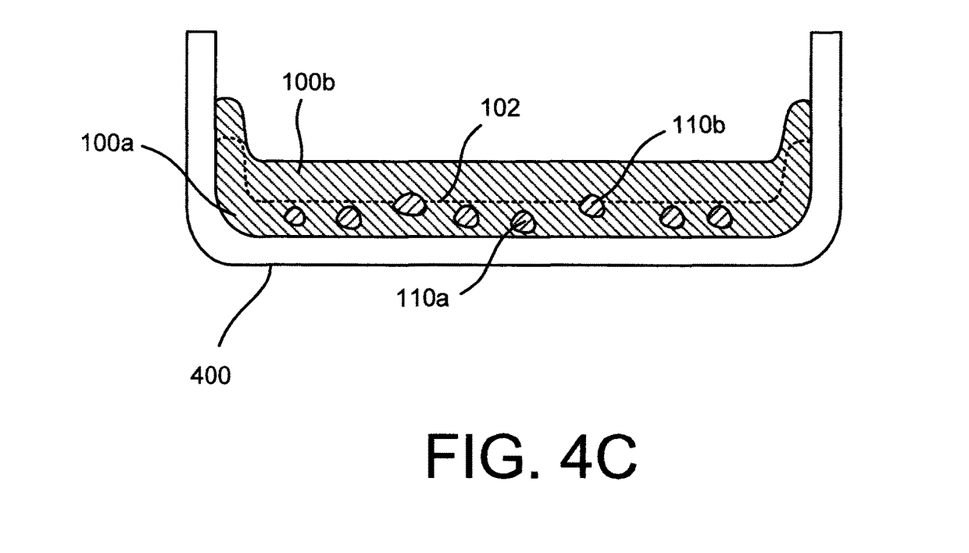

As shown in FIG. 4C, a second portion of glass 100b can then be applied to the outer surface 102 of the first portion of glass 100a. Again, this can be performed using known techniques, such as "pressing" or "blowing," and at different temperatures (e.g., workable and/or molten, as discussed above). If the crystals are pressed completely into the glass 100a (e.g., 110a), then the second portion of glass 100b merely serves to increase the distance between the crystal (e.g., 110a) and the outer (or inner) surface of the resulting glass structure 100. Alternatively, if the crystals are only pressed partially into the glass 110a (e.g., 110b), then the second portion of glass 100b serves to encapsulate the crystal (e.g., 110b) within the glass structure 100.

In one embodiment, the mold shown in FIG. 4A (i.e., 400) is the mold that is used to form the glass into a desired shape (e.g., a vessel for holding liquid, etc.). In another embodiment of the present invention, after crystals are incorporated into the glass (e.g., using the mold 400 shown in FIG. 4A), the glass can then be formed into the desired shape. This may be accomplished using any number of tools, including, but not limited to a second mold, such as the one shown in FIG. 5. When using a second mold, the glass will generally be cooled, allowing it to be moved between molds, and then re-heated, allowing it to be formed (e.g., by "pressing" or "blowing" the glass). If the second mold includes two halves, like the one shown in FIG. 5, then the two halves 510, 520, which are held together via a hinge 530, are closed, allowing the glass to be formed into the desired shape, such as the one shown in FIG. 1. In forming the desired shape, it is imperative to keep the glass heated (e.g., between 730° and 1,040° C.), allowing it to remain pliable, but not to a temperature that is too high (e.g., above 1600° C.). While glass can be formed at high temperatures, high temperatures will destroy the crystalline properties of the crystals, or the $SiO_2$ included therein. As discussed above, a critical aspect of the invention is to keep the crystals in a crystalline state, so that they can be used, for example, to impart energy into liquid.

Once the glass is formed, the entire apparatus must be "annealed." This can be accomplished as discussed above, or via a conveyor-belt process, where the temperature is gradually reduced as the apparatus moves along the conveyer-belt. For example, a temperature between 450° and 510° C. may exist at the belt's beginning, a temperature between 20° and 100° C. may exist at the belt's end, and the apparatus may take a time between one and a half and three and a half hours to travel the length of the conveyor-belt. This slow cooling ensures that the apparatus is uniformly reduced to room temperature and the stress point of the glass is not triggered.

Figure 6:
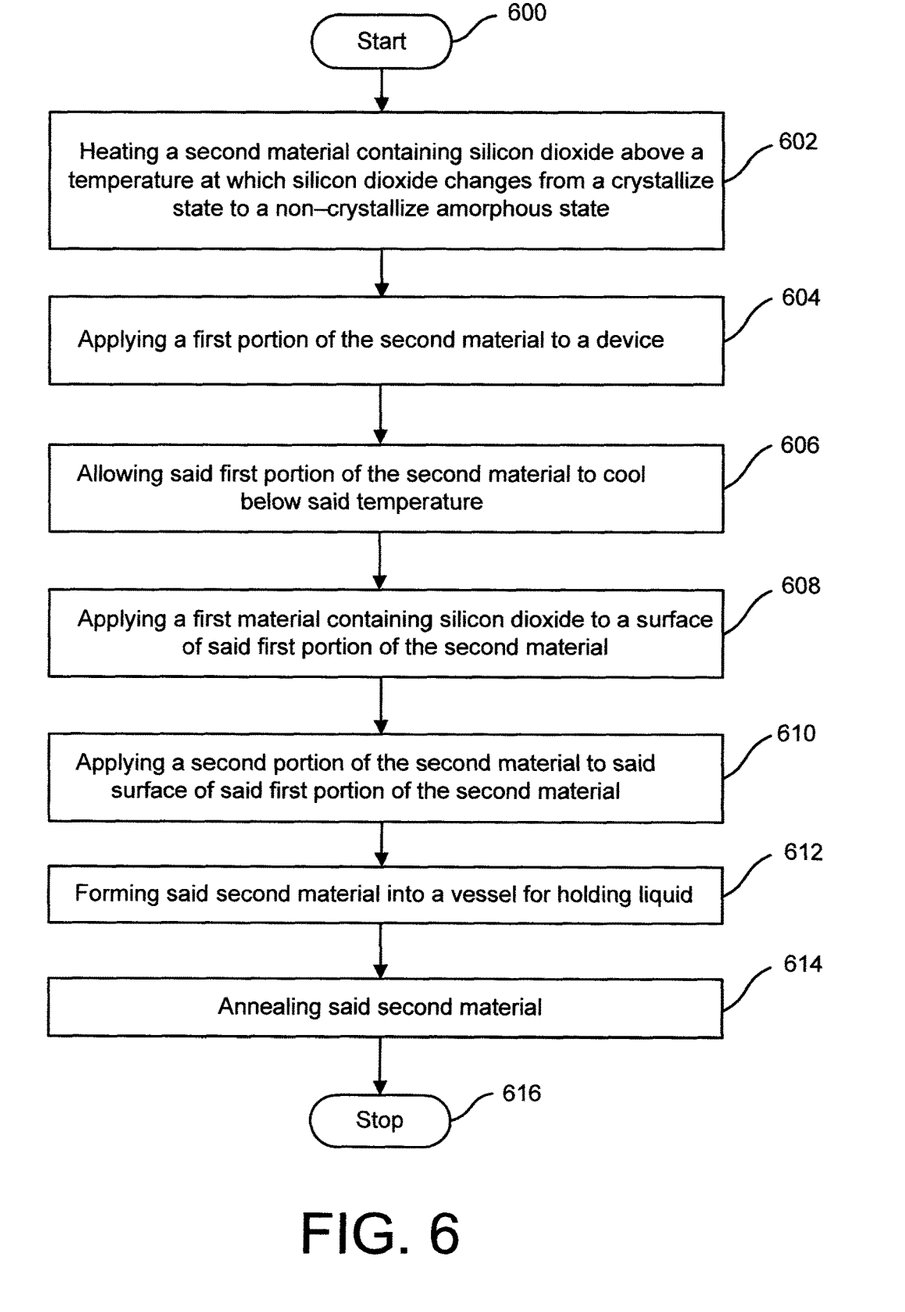
FIG. 6 describes a method for manufacturing the glass vessel shown in FIG. 1 in accordance with one embodiment of the present invention.

A method for manufacturing a glass structure, such as a vessel for holding liquid, in accordance with one embodiment of the present invention is shown in FIG. 6. Starting at step 600, a glass material containing silicon dioxide ($SiO_2$), such as Soda-Lime-Silica, Pyrex, etc., is heated to its melting point, which is generally around 1600° C. at step 602. It is at this temperature that the $SiO_2$ included in the glass material is converted from a crystalline state to a non-crystalline amorphous state. At step 604, a first portion of the melted glass is applied to a device, such as a blow pipe or a mold. At step 606, the first portion of glass is cooled below its melting point, but within a range considered to be workable (generally between 730°-1,040° C.). At this temperature, a plurality of crystals, such as Clear Quartz, Citrine, etc., are applied to an outer surface of the first portion of glass at step 608. A second portion of glass (e.g., melted glass) is then applied to the outer surface of the first portion of glass at step 610. The glass material, which now includes a plurality of crystals, is formed into a desired shape, such as a vessel for holding liquid, at step 612. It should be appreciated that when forming the desired shape, the glass material must be heated (i.e., to remain pliable), but not to a temperature too high. If the crystals are heated to a high temperature (e.g., between 1670° and 1713° C.), their crystalline properties will be destroyed (i.e., they will be converted from a crystalline state to a non-crystalline amorphous state). And they will not be converted back to a crystalline state when they are cooled over a matter of hours. This is because a crystal is more easily destroyed than formed. The shaped structure is then annealed at step 614, ending the method at step 616.

It should be appreciated that the present invention is not limited to the method described in FIG. 6, and may include different, fewer, or additional steps. For example, after the crystals are applied to the first portion of glass, the glass (along with the crystals) may be heated, allowing the glass to better "accept" the crystals. By way of another example, if the crystals are pressed completely (and sufficiently) into the first portion of glass, a second portion of glass may not need to be applied, thereby eliminating step 610.

Having thus described several embodiments of a method for infusing silicon dioxide ($SiO_2$) in a crystalline state into $SiO_2$ in a non-crystalline amorphous state, it should be apparent to those skilled in the art that certain advantages of the method have been achieved. It should also be appreciated that various modifications, adaptations, and alternative embodiments thereof may be made within the scope and spirit of the present invention. The invention is solely defined by the following claims.

What is claimed is:

1. A method for manufacturing a vessel for holding liquid comprising at least a first set of silicon dioxide ($SiO_2$) in its crystalline state infused within a second set of $SiO_2$ in a non-crystalline amorphous state, comprising:
   heating a second material comprising at least said second set of $SiO_2$ to a temperature that converts said second set of $SiO_2$ from a crystalline state into a non-crystalline amorphous state;
   applying a first portion of said second material to a device, said first portion of said second material as applied to said device having at least a first surface adjacent said device and a second surface opposite said first surface;
   applying a first material comprising at least said first set of $SiO_2$ to said second surface of said first portion of said second material, said application (i) taking place at a temperature that is above that which would allow said second material to remain pliable but below that which would result in said first set of $SiO_2$ being converted from its crystalline state into a non-crystalline amorphous state and (ii) resulting in said first material being pressed at least partially into said second surface of said first portion of said second material;
   applying a second portion of said second material to at least said second surface of said first portion of said second material, said first material being fully encapsulated within said second material; and
   forming said second material into a shape of said vessel for holding liquid, said forming taking place at a temperature that is above that which would allow said second material to remain pliable but below that which would result in said first set of $SiO_2$ being converted from its crystalline state into a non-crystalline amorphous state.

2. The method of claim 1, wherein said step of heating said second material to a temperature that converts said second set of $SiO_2$ from a crystalline state into a non-crystalline amorphous state further comprises heating said second material to a temperature that is greater than 1400° C.

3. The method of claim 1, wherein said step of applying said first portion of said second material to said device, further comprises using a blow pipe to gather said first portion of said second material and rolling said first portion over a marver.

4. The method of claim 3, wherein said step of applying said first material to said second surface of said first portion of said second material, further comprises rolling an outer surface of said first portion of said second material over said first material.

5. The method of claim 4, wherein said step of applying said first material to said second surface of said first portion of said second material takes place at a temperature that is between 700° and 1600° C.

6. The method of claim 4, wherein said step of applying said second portion of said second material to said second surface of said first portion of said second material, further comprises using said blow pipe to at least gather said second portion of said second material.

7. The method of claim 1, wherein said step of applying said first portion of said second material to said device, further comprises at least one of pressing and blowing said first portion of said second material into a mold.

8. The method of claim 7, wherein said step of applying said first material to said second surface of said first portion of said second material, further comprises blowing said first material at least partially onto an inner surface of said first portion of said second material.

9. The method of claim 8, wherein said step of applying said second portion of said second material to at least said second surface of said first portion of said second material, further comprises at least one of pressing and blowing said second portion of said second material onto at least an inner surface of said first portion of said second material.

10. The method of claim 1, further comprising the step of applying heat to said first material to allow said first material to better bond with said first portion of said second material, said heating of said first material being kept below a temperature that would convert said first set of $SiO_2$ into a non-crystalline amorphous state.

11. The method of claim 1, further comprising annealing said second material to relieve internal stresses introduced during the manufacturing process.

12. The method of claim 1, wherein said first material comprises a plurality of quartz crystals.

13. The method of claim 12, wherein each one of said plurality of quartz crystals has a cross-section between 0.8 mm to 4.0 mm.

14. The method of claim 1, wherein said second material further comprises at least sodium oxide ($Na_2O$) and calcium oxide (CaO).

15. The method of claim 1, wherein said second material further comprises at least boric oxide ($B_2O_3$), sodium oxide ($Na_2O$) and alumina ($Al_2O_3$).

16. A process for manufacturing a liquid container comprising a first material infused within a second material, wherein said first material comprises at least silicon dioxide ($SiO_2$) in a crystalline state and said second material comprises at least $SiO_2$ in a non-crystalline amorphous state, comprising:

heating said second material, including said $SiO_2$ included therein, to at least 1400° C.;

applying a first portion of said second material to a device comprising one of a mold and a blow pipe, said first portion of said second material as applied having at least a first surface adjacent said device and a second surface opposite said first surface;

applying said first material to said second surface of said first portion of said second material such that said first material is pressed at least partially into said second surface of said first portion of said second material, wherein said application of said first material takes place at a temperature that (i) keeps said second material pliable and (ii) maintains said $SiO_2$ included in said first material in its crystalline state;

applying a second portion of said second material to at least said second surface of said first portion of said second material; and     forming said first material into said liquid container, said forming taking place at a temperature that (i) keeps said second material pliable and (ii) maintains said $SiO_2$ included in said first material in a crystalline state.

17. The method of claim 16, wherein said first material comprises a plurality of quartz crystals.

18. The method of claim 16, wherein said second material further comprises at least two of sodium oxide ($Na_2O$), calcium oxide ($CaO$), boric oxide ($B_2O_3$), and alumina ($Al_2O_3$).

\* \* \* \* \*